United States Patent
Aparicio Ojea et al.

(10) Patent No.: US 10,739,746 B2
(45) Date of Patent: Aug. 11, 2020

(54) USING SOFT-SENSORS IN A PROGRAMMABLE LOGIC CONTROLLER

(71) Applicant: Siemens Aktiengesellschaft, München (DE)

(72) Inventors: Juan L. Aparicio Ojea, Doylestown, PA (US); George Lo, Langhorne, PA (US); Justinian Rosca, West Windsor, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 278 days.

(21) Appl. No.: 15/522,462

(22) PCT Filed: Oct. 30, 2014

(86) PCT No.: PCT/US2014/063105
§ 371 (c)(1),
(2) Date: Apr. 27, 2017

(87) PCT Pub. No.: WO2016/068929
PCT Pub. Date: May 6, 2016

(65) Prior Publication Data
US 2017/0371311 A1 Dec. 28, 2017

(51) Int. Cl.
*G05B 19/042* (2006.01)
*G05B 19/05* (2006.01)

(52) U.S. Cl.
CPC ....... *G05B 19/056* (2013.01); *G05B 19/0423* (2013.01); *G05B 19/054* (2013.01);
(Continued)

(58) Field of Classification Search
CPC .............. G05B 19/0423; G05B 19/054; G05B 19/056; G05B 2219/14055; G05B 2219/15108; G05B 2219/37537
See application file for complete search history.

(56) References Cited

U.S. PATENT DOCUMENTS 5,566,176 A * 10/1996 Chang .................. G05B 19/052
709/228
9,171,254 B2 10/2015 Cescolini et al.
(Continued)

FOREIGN PATENT DOCUMENTS

CN 101587350 A 11/2009
CN 102042203 A 5/2011
(Continued)

OTHER PUBLICATIONS

PCT International Search Report dated Jun. 8, 2015 corresponding to PCT International Application No. PCT/US2014/063105 filed Oct. 30, 2014 (14 pages).
(Continued)

*Primary Examiner* — Michael J Huntley (57) ABSTRACT

A method of operating an intelligent programmable logic controller over a plurality of scan cycles includes the intelligent programmable logic controller selecting one or more soft-sensors available in a control program corresponding to a production unit, each soft-sensor comprising a local parameter or variable used by the control program. The intelligent programmable logic controller determines updated soft-sensor values corresponding to the one or more soft-sensors during each scan cycle and stores those values during each scan cycle on a non-volatile computer-readable storage medium operably coupled to the intelligent programmable logic controller. Additionally, the intelligent programmable logic controller annotates the updated soft-sensor values with automation system context information to generate contextualized data.

19 Claims, 6 Drawing Sheets

(52) U.S. Cl.
CPC .............. *G05B 2219/14055* (2013.01); *G05B 2219/15108* (2013.01); *G05B 2219/37537* (2013.01)

(56) References Cited

U.S. PATENT DOCUMENTS

| | | | |
|---|---|---|---|
| 9,438,648 B2 | 9/2016 | Asenjo et al. | |
| 2006/0259160 A1* | 11/2006 | Hood | G05B 19/4188 700/20 |
| 2007/0118338 A1* | 5/2007 | Grichnik | F02D 41/1401 703/2 |
| 2009/0088885 A1* | 4/2009 | Yuan | G05B 19/41885 700/110 |
| 2010/0161085 A1 | 6/2010 | Sumiya | |
| 2012/0254517 A1* | 10/2012 | Jang | G05B 19/05 711/103 |
| 2012/0323343 A1 | 12/2012 | Grichnik et al. | |
| 2013/0297548 A1* | 11/2013 | Cescolini | G06N 5/00 706/46 |
| 2014/0337429 A1* | 11/2014 | Asenjo | H04L 65/403 709/204 |
| 2015/0094988 A1* | 4/2015 | Schumacher | G01M 99/00 702/188 |
| 2015/0286204 A1* | 10/2015 | Yamaoka | G05B 19/056 700/86 |
| 2016/0054720 A1 | 2/2016 | Lo et al. | |

FOREIGN PATENT DOCUMENTS

| | | | | |
|---|---|---|---|---|
| CN | 102084303 A | 6/2011 | | |
| CN | 102486639 A | 6/2012 | | |
| CN | 102830649 A | 12/2012 | | |
| CN | 103163820 A | 6/2013 | | |
| DE | 102012207437 B3 * | 5/2013 | ............... | G06N 5/00 |
| JP | 2006345795 A | 12/2006 | | |
| KR | 20040042874 A | 5/2004 | | |

OTHER PUBLICATIONS

Pietropaoli Bastien et al: "Virtual sensors and data fusion in a multi-level context computing architecture", Proceedings of the 16th International Conference on Information Fusion, ISIF ( Intl Society of Information Fusi, Jul. 9, 2013 (Jul. 9, 2013) , pp. 101-108, XP032512471 / Jul. 9, 2013.

Min Wu et al: "Integrated soft sensing of coke-oven temperature", Control Engineering Practice, Pergamon Press, Oxford, GB, vol. 19, No. 10, Jun. 2, 2011 pp. 1116-1125 XP028274791 / Jun. 2, 2011.

Kadlec P et al: "Data-driven Soft Sensing in the process industry", Computers & Chemical Engineering, Pergamon Press, Oxford, GB, vol. 33 No. 4,Apr. 21, 2009 pp. 795-814 t XP025990509 / Apr. 21, 2009.

Report of Examination dated Dec. 27, 2018 corresponding to CN Application No. 201480083065.5 filed Oct. 30, 2014 (11 pages).

Report of Examination dated Feb. 21, 2018 corresponding to EP Application No. 14799087.3 filed Mar. 10, 2017 (7 pages).

Eren, Halit: "Assessing the Health of Sensors Using Data Historians"; XP032141824; Curtin University; 987-1-4577-1725-3/12$26. 00: IEEE.

Chinese Search Report dated Jun. 5, 2020; Application No. 2014800830655; 5 pages.

* cited by examiner

USING SOFT-SENSORS IN A PROGRAMMABLE LOGIC CONTROLLER

This application is a national phase filing under 35 U.S.C. § 371 of International Patent Application No. PCT/US2014/063105, filed Oct. 30, 2014, which is incorporated herein by reference in its entirety.

TECHNICAL FIELD

The present invention relates generally to the use of control layer data (referred to herein as "soft-sensors") in a programmable logic controller. The disclosed technology may be applied to, for example, various automated production environments where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system.

PLCs are utilized in various industrial settings to control automation systems. Automation systems typically generate a large amount of data in their daily operations. This data may include, for example, sensor data, actuator and control program parameters, and information associated with service activities. However, conventional automation systems, and PLCs in particular, are not capable of adequately handling this data. For example, in most systems, due to hardware and software limitations, only a small fraction of automation system data can be analyzed and stored. Massive amounts of irrelevant data may be produced while important data points are missed. Compression may be applied at the higher automation layers on unimportant data, while important data is lost while travelling through the automation layers. Moreover, even where there are attempts to avoid the loss of data, there may be significant demands placed on the rest of the computing infrastructure. For example, the PLC data processing may result in a high demand on the network bandwidth as well as storage capacity. Additionally, the context of data may be lost while data passed through automation system layers. This causes several undesired secondary effects on the automation system. For example, if data analytics are performed at higher automation layers based on low quality/fidelity data, important data may be lost causing the automation system to operate inefficiently or sub-optimally.

As a result of insufficient data handling capabilities at the control layer, quality problems are usually detected late. In conventional systems, only a few process variables can be continuously monitored at the higher automation layers (e.g., Supervisory Control and Data Acquisition) with adequate fidelity. Although the most relevant sensors (e.g., temperature and pressure of a fermentation tank, or a position sensor in a car door assembly cell) are monitored, many other variables, including important control variables, are ignored even though these variables may also be used to identify certain problems. Examples of important variables that may not be exposed to high automation layers include, without limitation, pressure valve position, coolant flow rate, oscillation control loop count, positioning time, etc. Such variables hold important control knowledge that might indicate quality problems in an early stage.

Additionally, due to insufficient data handling capabilities, control knowledge is not sent to the higher automation layers for business analytics. Typically the control knowledge is hidden inside the control program that runs into the controller or it is available only at the engineering system (e.g. Siemens TIA Portal software) used to write control programs. A great deal of effort is required to rebuild such control knowledge at higher layers of the automation system. In particular, the realization of higher level software functionality in Supervisory Control and Data Acquisition, Manufacturing Execution Systems, or Enterprise Resource Planning systems becomes much more complicated and costly. In turn, this leads to higher development and customization costs of these solutions. For example, consider a valve control program for controlling coolant flow until tank temperature reaches a certain level. One can infer that there has to be a certain correlation between coolant flow rate and temperature decrease (with some delay). To detect such correlations (which can be utilized for predictive process monitoring at higher layers) a pairwise correlation analysis using hundreds of parameters is required.

SUMMARY

Embodiments of the present invention address and overcome one or more of the above shortcomings and drawbacks, by providing methods, systems, and apparatuses related to a PLC configured to which is able to monitor and utilize values associated with control layer variables. These variables, referred to herein as "soft-sensors" may include, for example, variables derived from control context (e.g., hidden control parameters or variables) or derived variables from certain analytics (e.g. variables to calculate alarms). This technology is particularly well-suited for, but not limited to, various industrial automation settings.

According to some embodiments of the present invention, a method of operating an intelligent programmable logic controller over a plurality of scan cycles includes the intelligent programmable logic controller selecting one or more soft-sensors available in a control program corresponding to a production unit, each soft-sensor comprising a local parameter or variable used by the control program. The intelligent programmable logic controller determines updated soft-sensor values corresponding to the one or more soft-sensors during each scan cycle and stores those values during each scan cycle on a non-volatile computer-readable storage medium operably coupled to the intelligent programmable logic controller. Additionally, the intelligent programmable logic controller annotates the updated soft-sensor values with automation system context information to generate contextualized data.

The exact contents of the automation system context information used in the aforementioned method may vary. For example, in some embodiments, the automation system context information comprises one or more of an indication of a device that generated data associated with the updated soft-sensor values, a structural description of an automation system comprising the intelligent programmable logic controller, a system working mode indicator, and information about a product that was produced while the updated soft-sensor values were determined. In other embodiments, the automation system context information comprises one or more of a description of automation software utilized by the intelligent programmable logic controller or a status indictor indicative of a status of the automation software while the updated soft-sensor values were determined.

In various embodiments, the aforementioned method may be enhanced or refined with additional features. For example in one embodiment, the intelligent programmable logic controller identifies a soft-sensor symbol table associated with the control program. The soft-sensors may then be selected using the soft-sensor symbol table. In another embodiment, the intelligent programmable logic controller applies data analytics algorithms to at least one of the contextualized data and the updated soft-sensor values to yield calculated data which is then used to adjust data generation parameters of the production unit. In another embodiment, the intelligent programmable logic controller retrieves historical soft-sensor values from the non-volatile computer-readable storage medium executes data analytics algorithms on those historical soft-sensor values.

In some embodiments, compression techniques may be applied to the aforementioned method. For example, in some embodiments, the intelligent programmable logic controller compresses the updated soft-sensor values during each scan cycle prior to storing the updated soft-sensor values on the non-volatile computer-readable storage medium. In some embodiments, the intelligent programmable logic controller compresses the contextualized data to yield compressed contextualized data which is then stored on the non-volatile computer-readable storage medium operably coupled to the intelligent programmable logic controller.

In some embodiments, the aforementioned method may be used in a system, device, or article or manufacture. For example, in one embodiment, an article of manufacture for operating an intelligent programmable logic controller over a plurality of scan cycles includes a non-transitory, tangible computer-readable medium holding computer-executable instructions for performing the aforementioned method.

In some embodiments, an intelligent programmable logic controller includes a processor, a volatile computer-readable storage medium, a non-volatile computer-readable storage medium, and controller components executed by the processor according to the scan cycle. The processor is configured to execute according to a scan cycle. The volatile computer-readable storage medium includes a process image area. The controller components include a soft-sensor selection component configured to select soft-sensors available corresponding to a production unit control program. Each soft-sensor includes a local parameter or variable associated with the production unit control program. The controller components further include a soft-sensor update component configured to update the process image area during each scan cycle with values associated with the soft-sensors and a historian component configured to store contents of the process image area during each scan cycle on the non-volatile computer-readable storage medium. In some embodiments, the historian component is further configured to adjust one or more data generation parameters (e.g., a sampling rate value) of a production unit associated with the production unit control program based on the calculated data.

In some embodiments, components may be added to the aforementioned intelligent programmable logic controller to provide additional functionality. For example, in one embodiment, the controller components further include a contextualization component configured to generate contextualized data by annotating the contents of the process image area with automation system context information and a data connector component configured to transmit the contextualized data to external components. In some embodiments, the intelligent programmable logic controller includes a data analytics component configured to execute one or more data analytics algorithms on the contextualized data to yield calculated data.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to an intelligent programmable logic controller (PLC) which is able to monitor and utilize values associated with control layer variables. These values, referred to herein as "soft-sensors" are consumed at the control layer in conventional systems. That is, they are not typically used at higher layers of an automation system. Moreover, in some instances, the accessibility and use of such soft-sensors within the controller itself may be limited. However, using the techniques described herein, soft-sensor values may be captured during each scan cycle and used for further processing such as producing data analytics or error analysis. The technology described herein may be applied in a variety of settings where control systems are used including, without limitation, industrial production environments.

Various embodiments of the present invention are described in the context of a PLC which includes various components configured to provide an assortment of enhanced functions in control applications. This PLC, referred to herein as an "Intelligent PLC" is described in greater detail in U.S. application Ser. No. 14/467,125 entitled "Intelligent Programmable Logic Controller," the entirety of which is incorporated herein by reference. Briefly, the Intelligent PLC offers several technical features which may be present in various combinations and used different embodiments of the present invention. The Intelligent PLC provides efficient data storage on control layer devices. More specifically, functionality of the control layer may be extended by an efficient storage mechanism for time series data (i.e., a "historian" function) which allows short-/mid-term archiving of high resolution time-stamped data. With high fidelity data, no events are lost. Efficient compression algorithms (e.g. a variation of swinging door) may be used to reduce storage and communication demands. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

Figure 1:
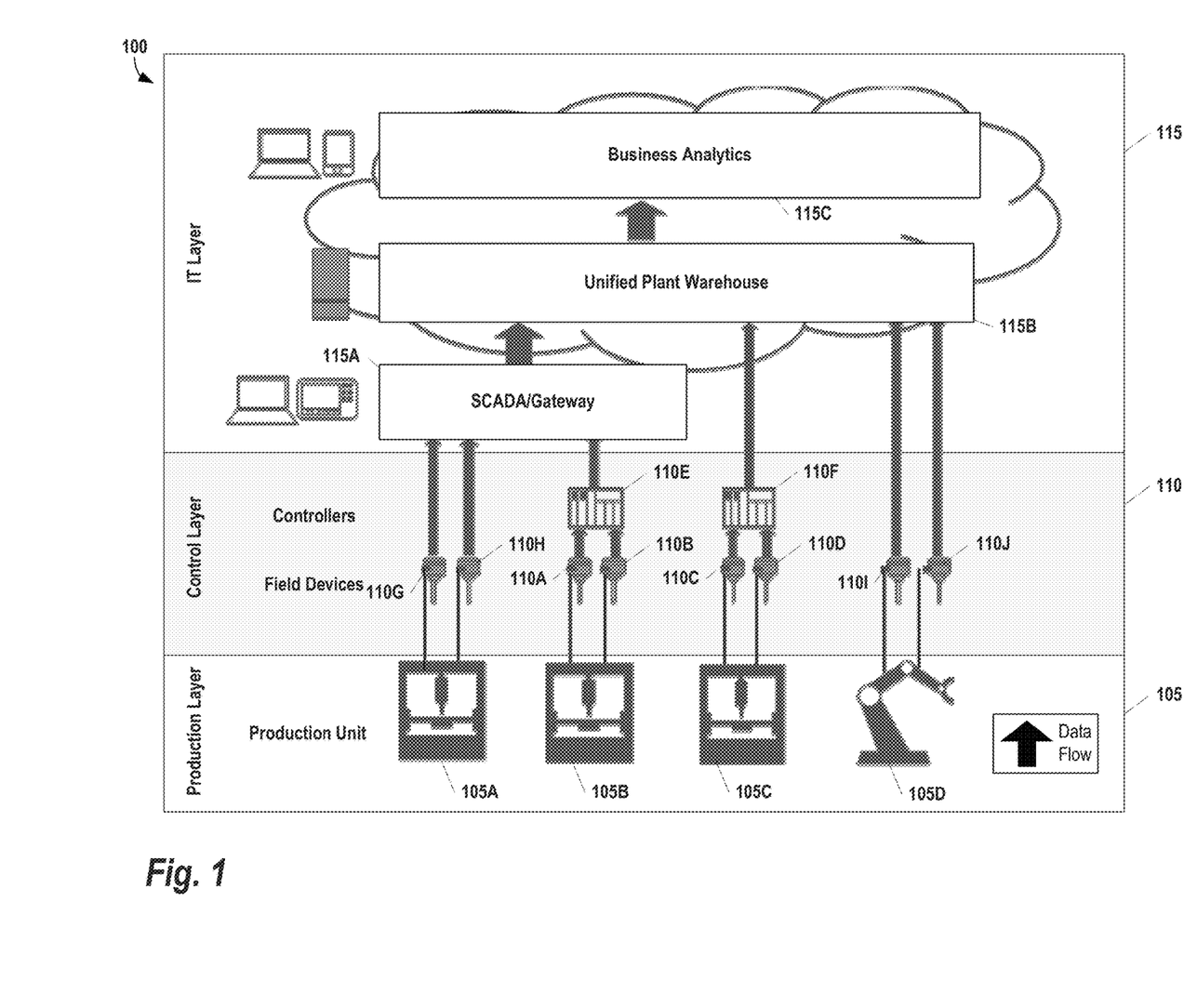
FIG. 1 provides a system view of an Intelligent PLCs integrated into an automation system, according to some embodiments of the present invention.

FIG. 1 provides a system view of an Intelligent PLCs integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 115 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Additionally, in some embodiments, the Intelligent PLCs 110E and 110F provide data analytics functionality directly on their respectively device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor, a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field devices known in the art may be used with the Intelligent PLC described herein. Example field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 2, Production Units 105B and 105C are connected through their respective field devices to Intelligent PLCs 110E and 110F, while Production Units 105A and 105D communicate directly through their respective Field Devices 110G, 110H, 110I, 110J to the Unified Plant Knowledge Warehouse 115B.

The Intelligent PLCs 110E and 110F may enrich data using additional context dimensions compared to state of the art systems (e.g., control knowledge, environmental conditions, and service incidences). This allows insights to be made from data analytics with higher confidence and quality. In some embodiments, the system 100 uses semantic data representation languages and standards for contextualization of data in automation systems. This allows business analytics as well as SCADA-level historians (e.g. OSI PI asset framework) to be configured with minimal effort for integration with data from other systems/devices/sources. Also the system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

In addition to the typical sensor inputs and control outputs that transferred to the IT Layer 115 or the Production Layer 105, the Intelligent PLCs 110E and 110F may store, utilize, and historize local control-layer parameters and variables, which in conventional automation systems are hidden inside the Control Layer 110. These local parameters and variables are collectively referred to herein as "soft-sensors." Because each soft-sensor corresponds to a value that is "local" in scope, the soft-sensor would ordinarily be ephemeral in nature, existing only as long as needed to assist in the calculation of a control output. However, using the techniques described herein, soft-sensors may be utilized even after the function or program in which they are defined completes execution.

Examples of soft-sensors that may be used in various embodiments of the present invention include control state information, control variables, control parameters, etc.; hidden variables that are used in the control programs; derived variables that have links to physical sensors; variables that are generated as part of analytics functions; and virtual sensors used in control. For example, consider control logic for PLC that receives an input signal from a production layer device, performs some calculations, and generates an output signal for the production layer device. In conventional systems, the IT Layer 115 or the Production Layer 105 are, at best, only aware of the input signal and the output signal. Any state information, parameters, or variables used in performing the calculations are only used internally within the PLC and, as a result, such data is lost once the output signal is generated. However, this data can be useful in fully understanding the operation of the automation system to perform functions such as optimization and error detection. Thus, using the techniques described herein, the soft-sensor data generated at the Control Layer 110 is captured for additional utilization by the system 100.

Figure 2:
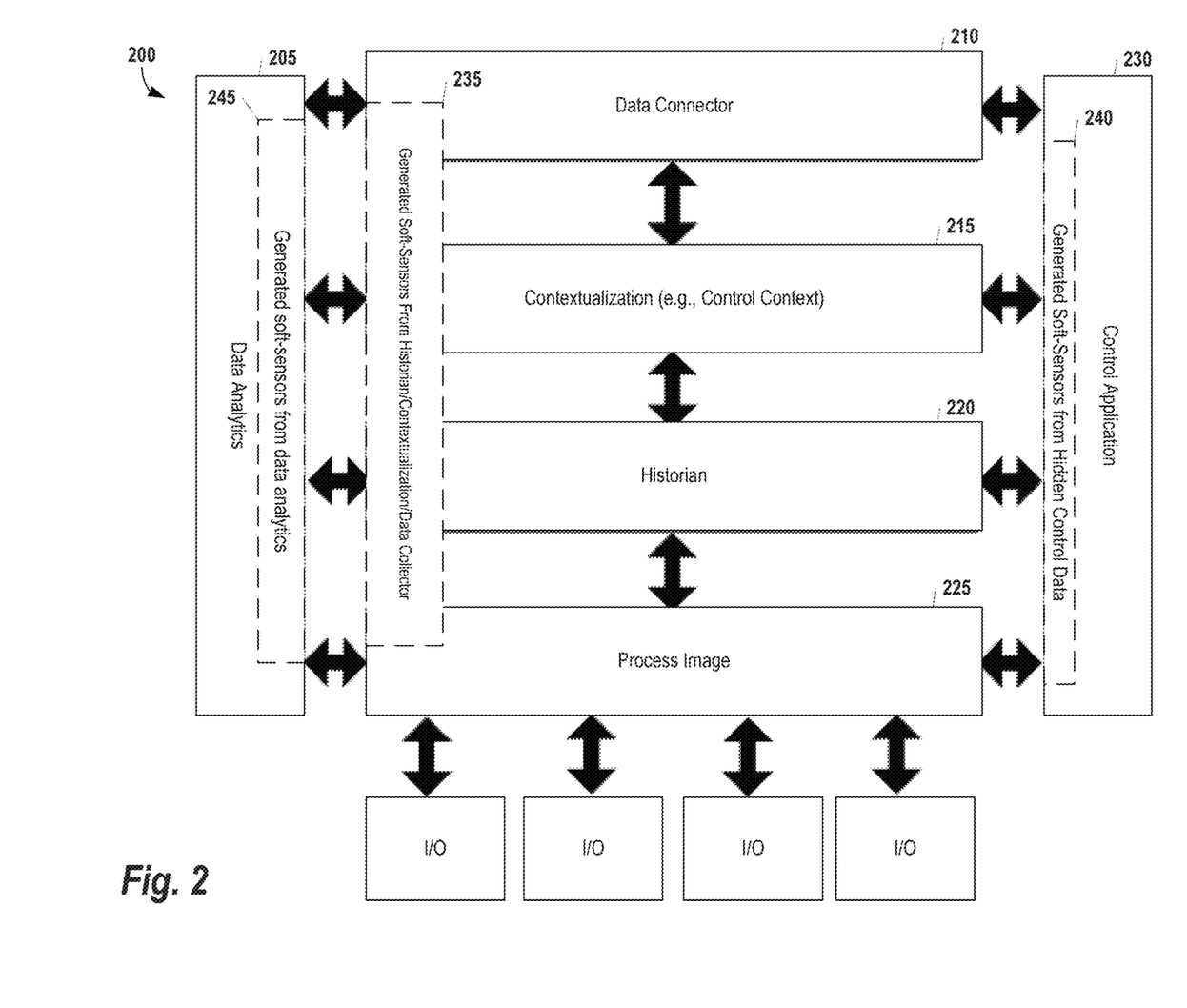
FIG. 2 provides an illustration of the system components included in an Intelligent PLC and their association with soft-sensor data, according to some embodiments of the present invention.

FIG. 2 provides an illustration of the system components 200 included in an Intelligent PLC and their association with soft-sensor data, according to some embodiments of the present invention. Process Image Component 225 is a memory area in a controller's CPU volatile system memory which is updated in each processing/scan cycle based on data associated with the production devices (e.g., the inputs and outputs of connected I/Os). In each processing step, the Control Application 230 reads the Process Image Component 225, executes deployed application logic, and writes results back into the Process Image Component 225. In various embodiments of the present invention, the Control Application 230 may include generated soft-sensors from hidden control data ("Hidden Control Data Soft-Sensors") 240 such as local variables and parameters that are not ordinarily accessible outside of the Control Application 230. As the Control Application writes results into the Process Image Component 225, it may additionally write the Hidden Control Data Soft-Sensors 240. In some embodiments, all Hidden Control Data Soft-Sensors 240 may be written to the Process Image Component 225 during each scan cycle. In other embodiments, the data written to the Process Image Component 225 during each scan cycle may be limited a user-selected subset of the Hidden Control Data Soft-Sensors 240.

Continuing with reference to FIG. 2, the process image of each cycle is read and permanently stored on a non-volatile physical storage medium by the Historian Component 220. In some embodiments, this Historian Component 220 is configured to deploy data compression algorithms to reduce data volume. It thereby can provide applications with access to past process images. Data may be stored either for a fixed time window or online algorithms are used to realize dynamic caching heuristics. As part of the Historian Component 220, intelligent data generation algorithms may continuously analyze the process image and context to adjust data generation parameters (e.g. sampling rate) of connected I/Os. For example, for fast changing sensor signals, a high sampling rate may be selected while for slowly changing sensor signals a lower sampling rate is sufficient.

The Data Analytics Component 205 comprises a set of data analysis algorithms that process the current or past process images (queried from the historian). Various data analysis algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the Data Connector Component 210. Thus, the Intelligent PLC may be viewed as a device for providing distributed analytics to the other devices in the automation system.

In various embodiments of the present invention, the Data Analytics Component 205 generates soft-sensor data 245 ("Data Analytics Soft-Sensors") as algorithms and/or models are executed. For example, as a data analysis algorithm is executed by the Data Analytics Component 205, various variables may be generated and stored as Data Analytics Soft-Sensors 245. In some embodiments, all Data Analytics Soft-Sensors 245 may be written to the Process Image Component 225 during each scan cycle. In other embodiments, the data written to the Process Image Component 225 during each scan cycle may be limited a user-selected subset of the Data Analytics Soft-Sensors 245.

A Contextualization Component 215 annotates incoming data with context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component is configured to provide data to any of the other components for more specific processing needs. The context information generated by the Contextualization Component 215 may not be restricted to the asset structure but may also include control knowledge, product-specific information, process information, event information, and potentially other aspects such external events like weather information. Some context information may be imported from engineering tools (e.g. Siemens Totally Integrated Automation tools). Additionally, in some embodiments, the Contextualization Component 215 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

Any data captured or generated by the components of system 200 may be provided to external components via a Data Connector Component 210. In some embodiments, the Data Connector Component 210 delivers data via a push methodology (i.e., actively sending to external component). In other embodiments, a pull methodology may be used where data is queried by external component). Additionally, push and pull methodologies may be combined in some embodiments such that the Intelligent PLC is configured to handle both forms of data transfer.

As shown in FIG. 2, Component-Level Soft-Sensors 235 may be generated within Data Connector Component 210, the Contextualization Component 215, and the Historian Component 220. During each scan cycle, the data associated with the Component-Level Soft-Sensors 235 may be written to the Process Image Component 225 and treated similar to other control data by the various components of the system 200. Thus, for example, the Contextualization Component 215 may create a conditional threshold based on control context data such that exceeding this threshold triggers an error event. Information related to this conditional threshold may be written to the Process Image Component 225 for historizing by the Historian Component 220. Additionally, such information may be provided to external devices by the Data Connector Component 210.

Figure 3:
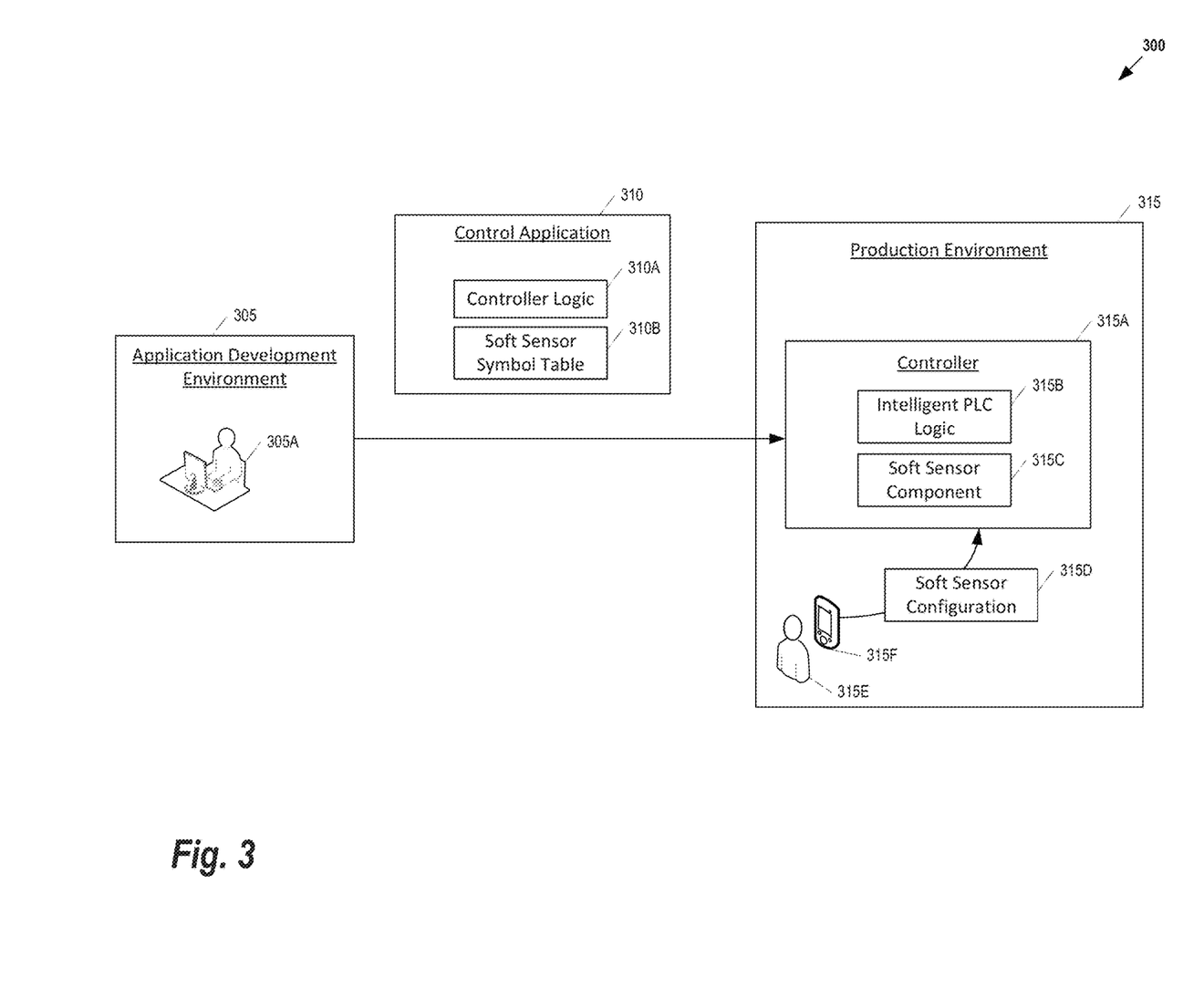
FIG. 3 provides an overview of how soft-sensor values may be selected, according to some embodiments of the present invention.

FIG. 3 provides an overview 300 of how soft-sensor values may be selected, according to some embodiments of the present invention. The example illustrated in FIG. 3 is divided into two locations: an Application Development Environment 305 and a Production Environment 315. Control Application 310 is created by Application Developer 305A operating within the Application Development Environment 305. During development of the Controller Logic 310A included in the Control Application 310, the Application Developer 305A performs one or more additional operations to make hidden control variables accessible outside of functions where they are declared and used. The additional operations may include, for example, manually identifying hidden control variables (e.g., by specifically marking the variables) or the use of tools which perform such identification automatically (e.g., during compilation of the PLC program without specific interaction). In embodiments such as the example of FIG. 3, the Application Developer 305A generates a Soft-Sensor Symbol Table 310B which maps instructions in the compiled Controller Logic 310A to their corresponding variable, function, or line in the Controller Logic 310A source code. Various techniques may be used for generating such a table. For example, in some embodiments, a parameter (e.g., "-softsensor") may be used to generate the Soft-Sensor Symbol Table 310B. In other embodiments, the Soft-Sensor Symbol Table 310B is a form of a debugger table which may be generated using debugger flags during compilation. Because the Soft-Sensor Symbol Table 310B may reveal details about the source code of the Controller Logic 310A, in some embodiments encryption or other security measures may be applied to the Control Application 310 prior to delivery to the Production Environment 315.

At the Production Environment 315, the Control Application 310 is installed and used on a Controller 315A executing Intelligent PLC Logic 315B which performs the functions described above with reference to FIG. 2. A Soft-Sensor Component 315C manages the processing and interpretation of the Soft-Sensor Symbol Table 310B. For example, the Soft-Sensor Component 315C may be used to select one or more soft-sensors available in the Intelligent PLC Logic 315B. Such selection may occur automatically via the Intelligent PLC Logic 315B as the Control Application 310 executes. For example, based on a particular set of observed conditions, the Intelligent PLC Logic 315B may determine that a particular soft-sensor variable should be monitored. Thus, it will automatically start historizing data for that variable. Alternatively, rather than having the selection be automatic, a user may provide instructions to the Intelligent PLC Logic 315B to select particular soft-sensor variables for monitoring. In the extreme case, all available soft-sensors may be monitored. However, due to computing constraints, it may be desirable to limit the number of monitored soft-sensors. Once the soft-sensors are selected, the Soft-Sensor Component 315C is used update the process image area during each scan cycle with values associated with those soft-sensors.

The functionality of the Soft-Sensor Component 315C may be partitioned into several components (e.g., a Soft-Sensor selection component and a Soft-Sensor update component). Additionally, in some embodiments, the Soft-Sensor Component 315C may be integrated into the Intelligent PLC system illustrated in FIG. 2. Thus, in contrast to FIG. 3, the Soft-Sensor Component 315C in those embodiments would be party of the Intelligent PLC Logic 315B.

In some embodiments, the Controller 315A and the Intelligent PLC Logic 315B includes networking functionality which allows the devices to communicate (directly or indirectly) with a wireless device 315F (e.g., tablet computer) operated by the onsite maintenance engineer 315E. This allows the Onsite Maintenance Engineer 315E to directly interact with the Soft-Sensor Component 315C. For example, the Onsite Maintenance Engineer 315E may use the wireless device 315F to view soft-sensor values as the Control Application 310 executes on the Controller 315A. Using the Intelligent PLC Logic 315B, the information provided to the Onsite Maintenance Engineer 315E may additionally include analytics and contextualization information. In some embodiments, the Soft-Sensor Component 315C additionally allows the Onsite Maintenance Engineer 315E to provide a Soft-Sensor Configuration 315D which can change the operation of the Soft-Sensor Component 315C. For example, the Soft-Sensor Configuration 315D may change the soft-sensors that are being monitored (i.e., adding or removing particular variables) or create conditional alarms based on the soft-sensors (e.g., if speed exceeds 5 m/s, send an alarm signal).

Figure 4:
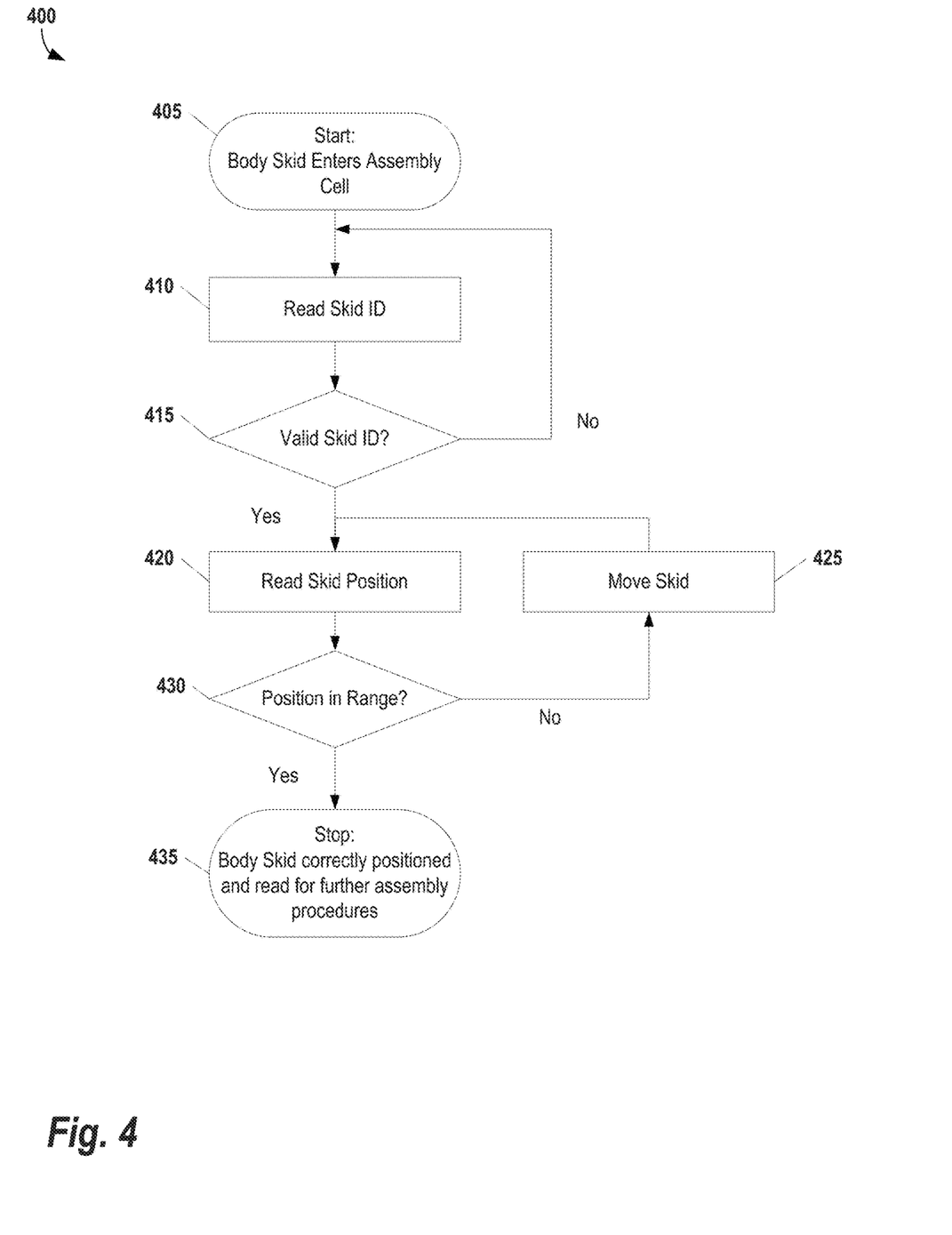
FIG. 4 shows a portion of a car door assembly process which illustrates where soft-sensor data could be utilized, according to some embodiments of the present invention.

FIG. 4 shows a portion of a car door assembly process 400 which illustrates where soft-sensor data could be utilized, according to some embodiments of the present invention. At 405, the body skid enters the assembly cell. Next, the ID of the body skid is confirmed by first reading it at 410 and then checking it at 415 to ensure that it's valid. After the ID of the skid is confirmed, the system tries to position the body skid in the right position for further assembly procedures. This may occur as a loop over one or more control cycles. At 420, the skid position is read and checked at step 430 to determine whether it is in the desired range. If the skid position is not in the desired range, it is moved at 425 and steps 420 and 430 are performed again. Once the skid is correctly positioned, the positioning process ends at 435 and the body skid is ready for further assembly procedures.

A control variable used in the PLC while performing the process 400 measures the number of control cycles that it takes to have the skid in the right position. In conventional systems, this variable is only used in real time for control and it is not historized. However, a record of the number of cycles that it takes to stabilize a skid inside a door assembly cell, could help to detect quality issues before the end of the line and forecast and prevent potential errors. Using the techniques described herein, these and other control variables may be historized, making them available, for example, for later contextualization and in-field analytics to analyze the process 400. For example, inside the PLC, the following variables may be used for controlling the process 400: speed, change in time ("DeltaTime"), and position. The PLC may use the following internal control logic: (i) car enters the cell; (ii) position is calculated by multiplying speed by DeltaTime; (iii) check position; and (iv) if the position is not acceptable, apply a position correction. In this case, DeltaTime is only used to calculate the skid position internally at the PLC. Thus, once it's used to update position, it is no longer maintained in storage. However, if DeltaTime is historized, in-filed analytics can make use of it. For example, it could be correlated with a "QualityError" variable in order to forecast and prevent positioning errors, as explained below with reference to FIG. 5.

Figure 5:
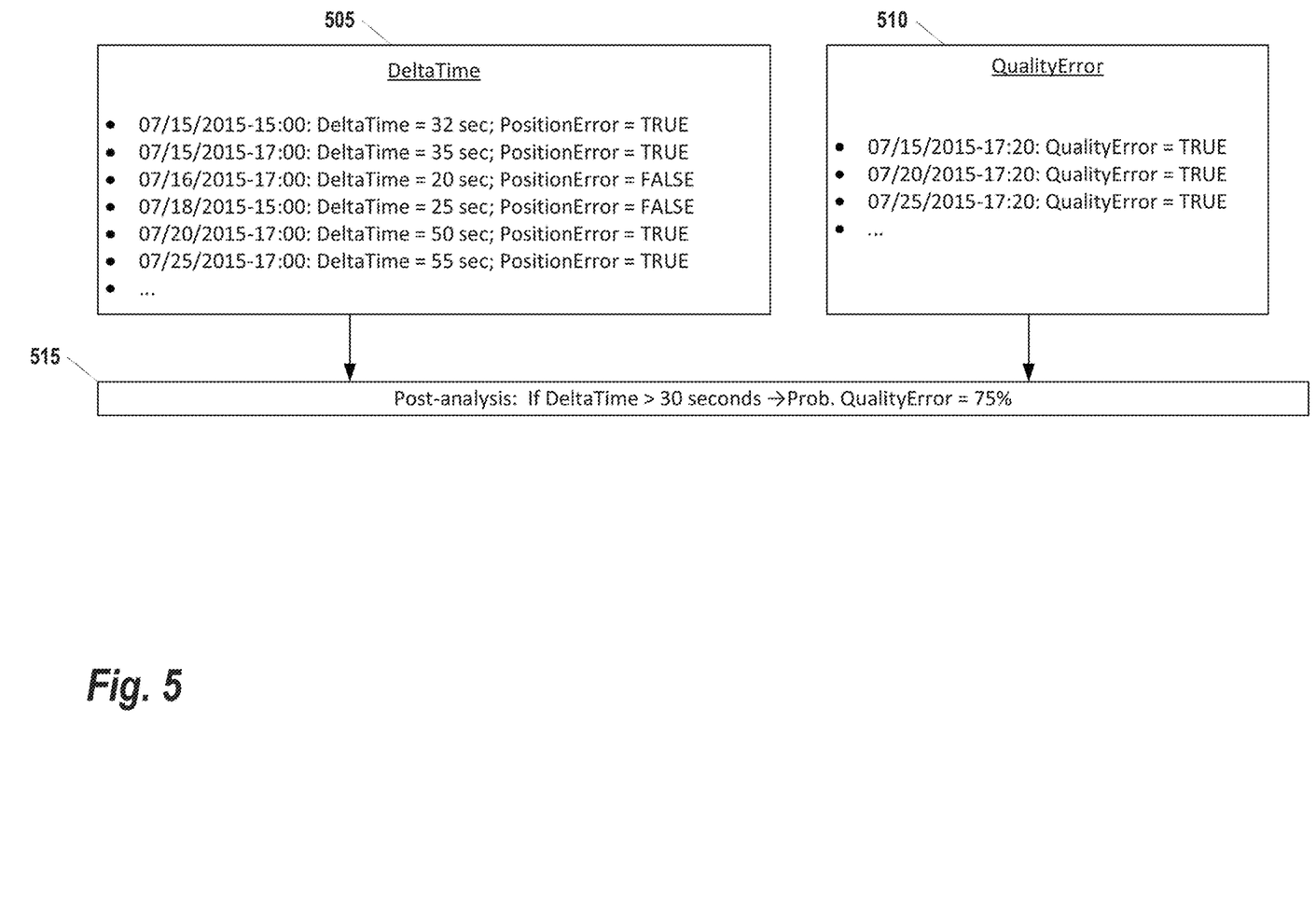
FIG. 5 illustrates how a soft-sensor may be used by an Intelligent PLC in order to discover the root cause of a problem, according to some embodiments of the present invention.

FIG. 5 illustrates how a soft-sensor may be used by an Intelligent PLC in order to discover the root cause of a problem, according to some embodiments of the present invention. In this example, as shown in the DeltaTime Data 505, a condition has been created such that if the soft-sensor DeltaTime has exceeded a certain threshold (e.g., 30 s), a position error event ("PositionError") is triggered. QualityError Data 510 indicates whether a quality error event is detected at the end of line. The Intelligent PLC may analyze the Data 505, 510 and perform a correlation study between quality error events and position error events. This analysis could reveal that the quality error is caused by a position error, which can be predicted by looking at the DeltaTime control variable. This is shown in Results 515 where it is determined that if DeltaTime is greater than the 30 second threshold, there is a 75% chance that a quality error event will occur. Based on this knowledge, the Intelligent PLC may issue instructions to the operator to avoid similar quality errors in the future. For example, the Intelligent PLC could notify the operator to perform a manual check of the position sensor as soon as DeltaTime is out of bounds, and find out the potential dirty or oily bar code reading, which could be the ultimate root cause of problems.

Figure 6:
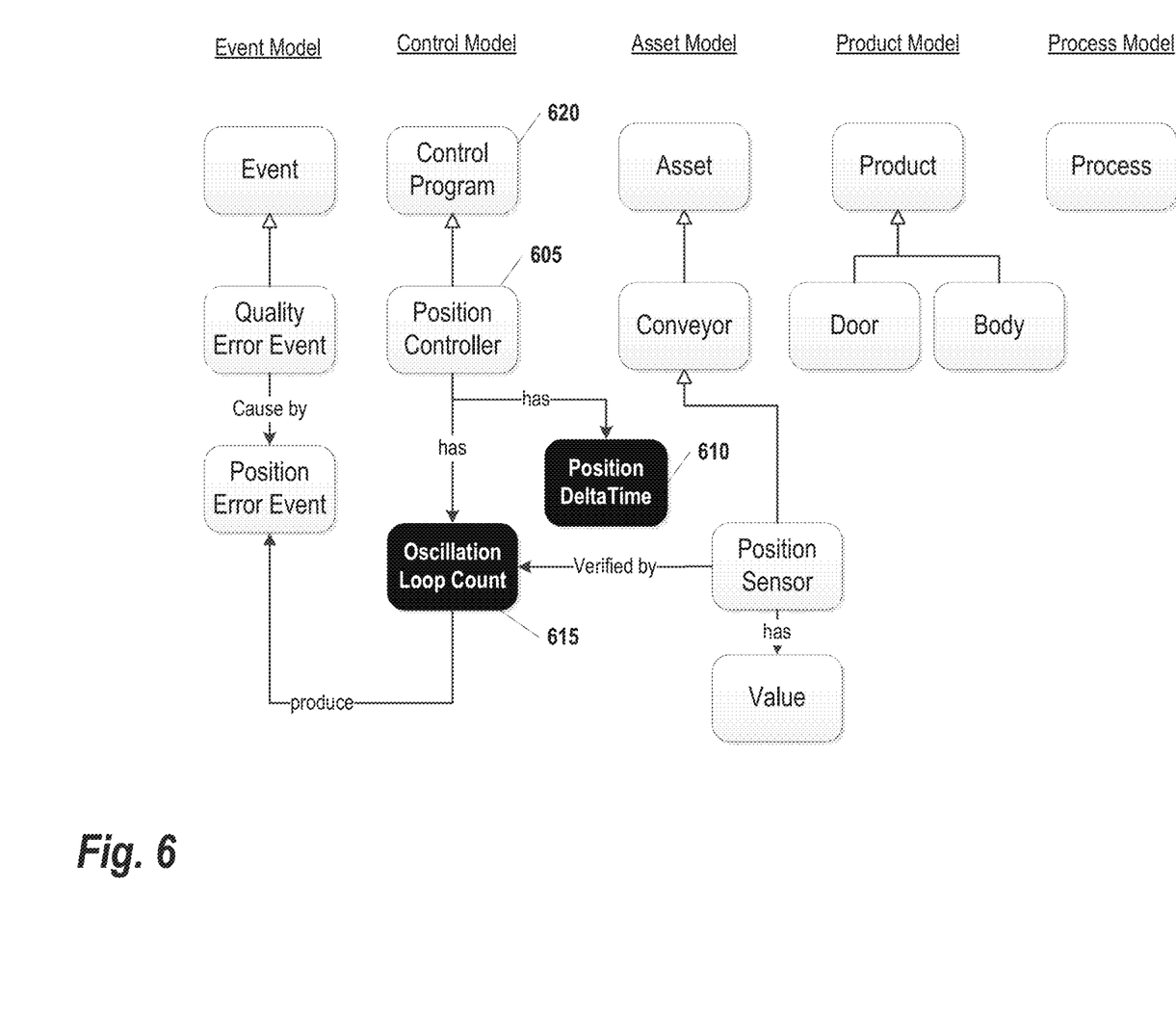
FIG. 6 shows a similar example of using soft-sensors in contextualization in the Smart PLC, according to some embodiments of the present invention

FIG. 6 shows a similar example of using soft-sensors in contextualization in the Smart PLC, according to some embodiments of the present invention. In this example, the oscillation loop count and the position delta time variables are used for root-cause analysis. The door assembly process is modeled by the smart PLC in five different context models, related with each other: an Event Model, a Control Model, an Asset Model, a Product Model, and a Process Model. The Position Controller 605 has two control variables: "Positioning Delta Time" 610 and "Oscillation Loop Count" 615. These two variables 610, 615 are relevant because they are used by the Control Program 620 to verify a potential position error in the position sensor. For example, once a high oscillation loop count or a long positioning time are detected, a position error event can be triggered, which indicates a quality error. Accordingly, the variables 610, 615 may be designated as soft-sensors (either automatically or based on user-selection). Then, additional analysis or computations may be performed on the values, as described above with reference to FIG. 6.

In some embodiments, the Intelligent PLC provides an ecosystem on top of which applications may be constructed which utilize soft-sensor data. For example, in one embodiment, the software of the Intelligent PLC includes an application programming interface (API) specifying how external software components can interact with the software operating on the Intelligent PLC. This API may include functions such as querying soft-sensor values, selecting soft-sensor values, and contextualizing soft-sensor values with high-layer data. The API may also be used to network individual Intelligent PLCs together, thereby creating a network of controllers which can enhance their processing of data by sharing soft-sensor data associated with their respective control programs.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of operating a programmable logic controller in a control layer of n multi-layered automation system over a plurality of scan cycles, the method comprising:
    selecting, by the programmable logic controller, one or more soft-sensors available in a control program corresponding to a production process, each soft-sensor comprising a hidden parameter or variable derived internally by the control program and not exposed to at least one layer of the automation system other than the control layer, wherein the selected soft-sensors are determined to be useful for data analytics based on a particular set of observed conditions during execution of the control program;
    historizing, by the programmable logic controller during each scan cycle, the hidden parameter or variable for the selected soft-sensor to produce a historical soft-sensor value by storing the historical soft-sensor value during each scan cycle on a non-volatile computer-readable storage medium operably coupled to the programmable logic controller;
    retrieving, by the programmable logic controller, one or more historical soft-sensor values from the non-volatile computer-readable storage medium; and
    executing, by the programmable logic controller, one or more data analytics algorithms on the one or more historical soft-sensor values to yield analytics data for analyzing the production process.

2. The method of claim 1, wherein the selecting further comprises:
    identifying, automatically by the programmable logic controller, the hidden variable or parameter for the soft-sensor using a soft-sensor symbol table generated during compilation of the control program.

3. The method of claim 1, further comprising:
    annotating, by the programmable logic controller, the historical soft-sensor values with automation system context information to generate contextualized data;
    applying, by the programmable logic controller, the one or more data analytics algorithms to at least one of the contextualized data and the historical soft-sensor values to yield calculated data; and
    adjusting one or more data generation parameters of the production unit based on the calculated data.

4. The method of claim 3, further comprising:
    compressing, by the programmable logic controller, the contextualized data to yield compressed contextualized data; and
    storing, by the programmable logic controller, the compressed contextualized data on the non-volatile computer-readable storage medium operably coupled to the programmable logic controller.

5. The method of claim 3, wherein the automation system context information comprises one or more of an indication of a device that generated data associated with the historical soft-sensor values, a structural description of an automation system comprising the programmable logic controller, a system working mode indicator, and information about a product that was produced while the historical soft-sensor value was determined.

6. The method of claim 3, wherein the automation system context information comprises one or more of a description of automation software utilized by the programmable logic controller or a status indictor indicative of a status of the automation software while the historical soft-sensor value was determined.

7. The method of claim 1, further comprising:
    compressing, by the programmable logic controller, the historical soft-sensor values during each scan cycle prior to storing the historical soft-sensor values on the non-volatile computer-readable storage medium.

8. A programmable logic controller operating in a control layer of a multi-layered automation system, the programmable logic controller comprising:
    a processor configured to execute according to a scan cycle;
    a volatile computer-readable storage medium comprising a process image area;
    a non-volatile computer-readable storage medium; and
    a plurality of controller components executed by the processor, the plurality of controller components comprising:
        a soft-sensor selection component configured to automatically select one or more available soft-sensors available in a control program corresponding to a production process in response to a set of one or more observed conditions, each soft-sensor comprising a hidden parameter or variable derived by the control program and not exposed to at least one layer of the automation system other than the control layer,
        a historian component configured to historize the hidden parameter or variable for the selected soft-sensor during each scan cycle to produce a historical soft-sensor value by storing the historical soft-sensor value on the non-volatile computer-readable storage medium, and
        a data analytics component configured to apply one or more data analytics algorithms to the historical soft-sensor values to analyze execution of the control program and yield analytics data for analyzing the production process.

9. The programmable logic controller of claim 8, wherein the plurality of controller components further comprise:
    a contextualization component configured to generate contextualized data by annotating the historical soft-sensor values with automation system context information, and a data connector component configured to transmit the contextualized data to one or more external components for distributed analytics of the production process.

10. The programmable logic controller of claim 9, wherein the historian component is further configured to adjust one or more data generation parameters of a production unit associated with the production process based on the analytics data.

11. The programmable logic controller of claim 10, wherein the one or more data generation parameters comprise a sampling rate value.

12. The programmable logic controller of claim 8, wherein the historian component is further configured to:
compress the values associated with the one or more soft-sensors during each scan cycle prior to storing the contents on the non-volatile computer-readable storage medium.

13. The programmable logic controller of claim 8, wherein the plurality of controller components further comprises:
a networking functionality configured to communicate with a wireless device for sending soft-sensor values, analytics and contextualization information to the wireless device and for receiving from the wireless device a soft-sensor configuration to change soft-sensors that are to be monitored or to create conditional alarms based on the soft-sensors.

14. The programmable logic controller of claim 8, wherein the soft-sensors include one of derived variables that have links to physical sensors, or variables that are generated as part of analytics functions.

15. The programmable logic controller of claim 8, wherein the a data analytics component is further configured to perform a correlation study between the historical soft-sensor values and data of a physical sensor to yield a forecasted probability for error.

16. An article of manufacture for operating a programmable logic controller in a control layer of a multi-layered automation system over a plurality of scan cycles, the article of manufacture comprising a non-transitory, tangible computer-readable medium holding computer-executable instructions for performing a method comprising:

selecting one or more soft-sensors available in a control program corresponding to a production process, each soft-sensor comprising a hidden parameter or variable derived internally by the control program and not exposed to at least one layer of the automation system other than the control layer, wherein the selected soft-sensors are determined to be useful for data analytics based on a particular set of observed conditions during execution of the control program;
historizing during each scan cycle, the hidden parameter or variable for the selected soft-sensor to produce a historical soft-sensor value by storing the historical soft-sensor value during each scan cycle on a non-volatile computer-readable storage medium operably coupled to the programmable logic controller;
retrieving one or more historical soft-sensor values from the non-volatile computer-readable storage medium; and
executing one or more data analytics algorithms on the one or more historical soft-sensor values to yield analytics data for analyzing the production process.

17. The article of manufacture of claim 16, wherein the selecting further comprises:
identifying, automatically, the hidden variable or parameter for the soft-sensor using a soft-sensor symbol table generated during compilation of the control program.

18. The article of manufacture of claim 17, wherein the method further comprises:
annotating, by the programmable logic controller, the historical soft-sensor values with automation system context information to generate contextualized data;
applying the one or more data analytics algorithms to at least one of the contextualized data and the historical soft-sensor values to yield calculated data; and
adjusting one or more data generation parameters of the production unit based on the calculated data.

19. The article of manufacture of claim 16, wherein the method further comprises
compressing the updated soft-sensor values during each scan cycle prior to storing the updated soft-sensor values on the non-volatile computer-readable storage medium.

* * * * *